No. 859,851. PATENTED JULY 9, 1907.
H. K. SMITH.
CAN SOLDERING MACHINE.
APPLICATION FILED NOV. 10, 1906.
3 SHEETS—SHEET 1.
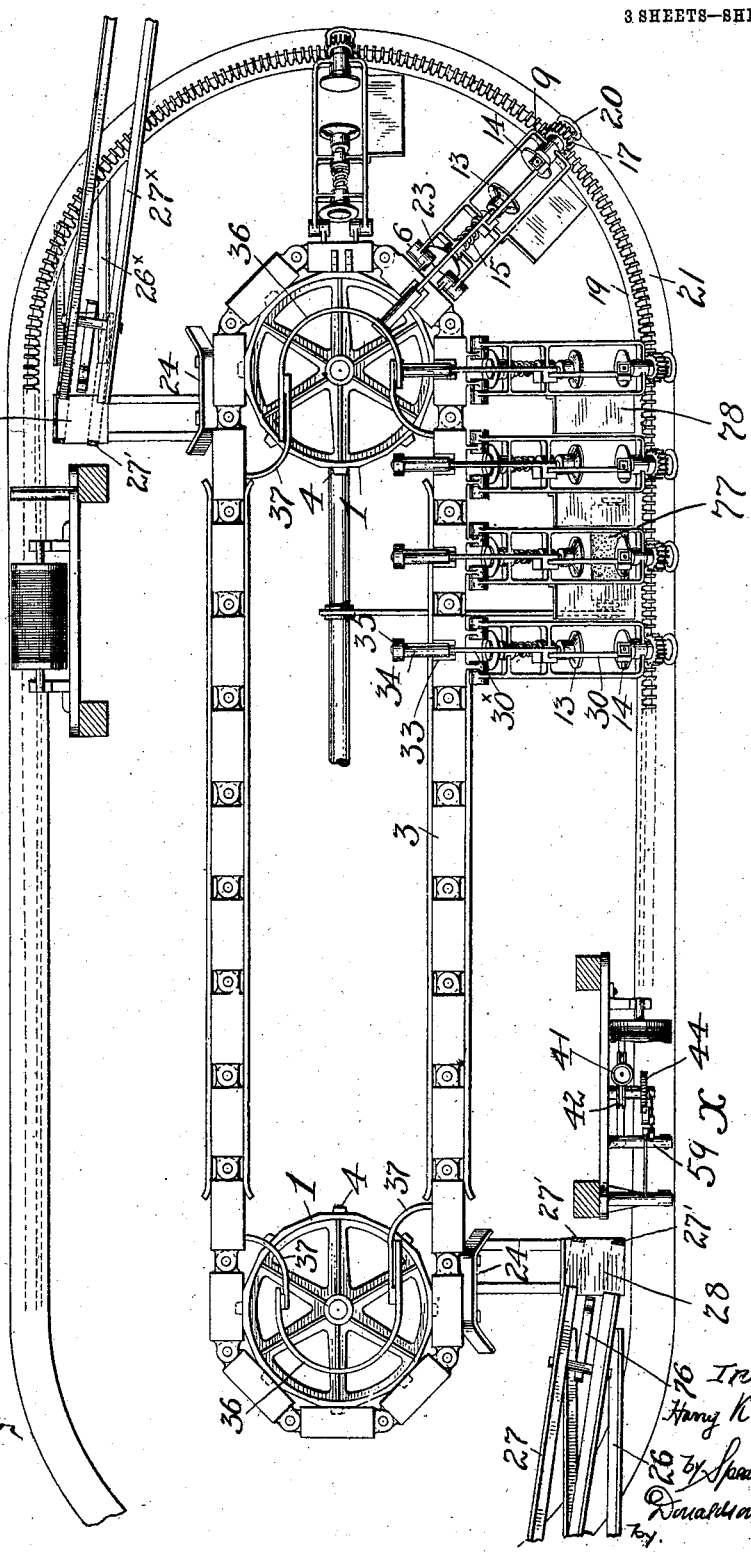

No. 859,851. PATENTED JULY 9, 1907.
H. K. SMITH.
CAN SOLDERING MACHINE.
APPLICATION FILED NOV. 10, 1906.
3 SHEETS—SHEET 2.
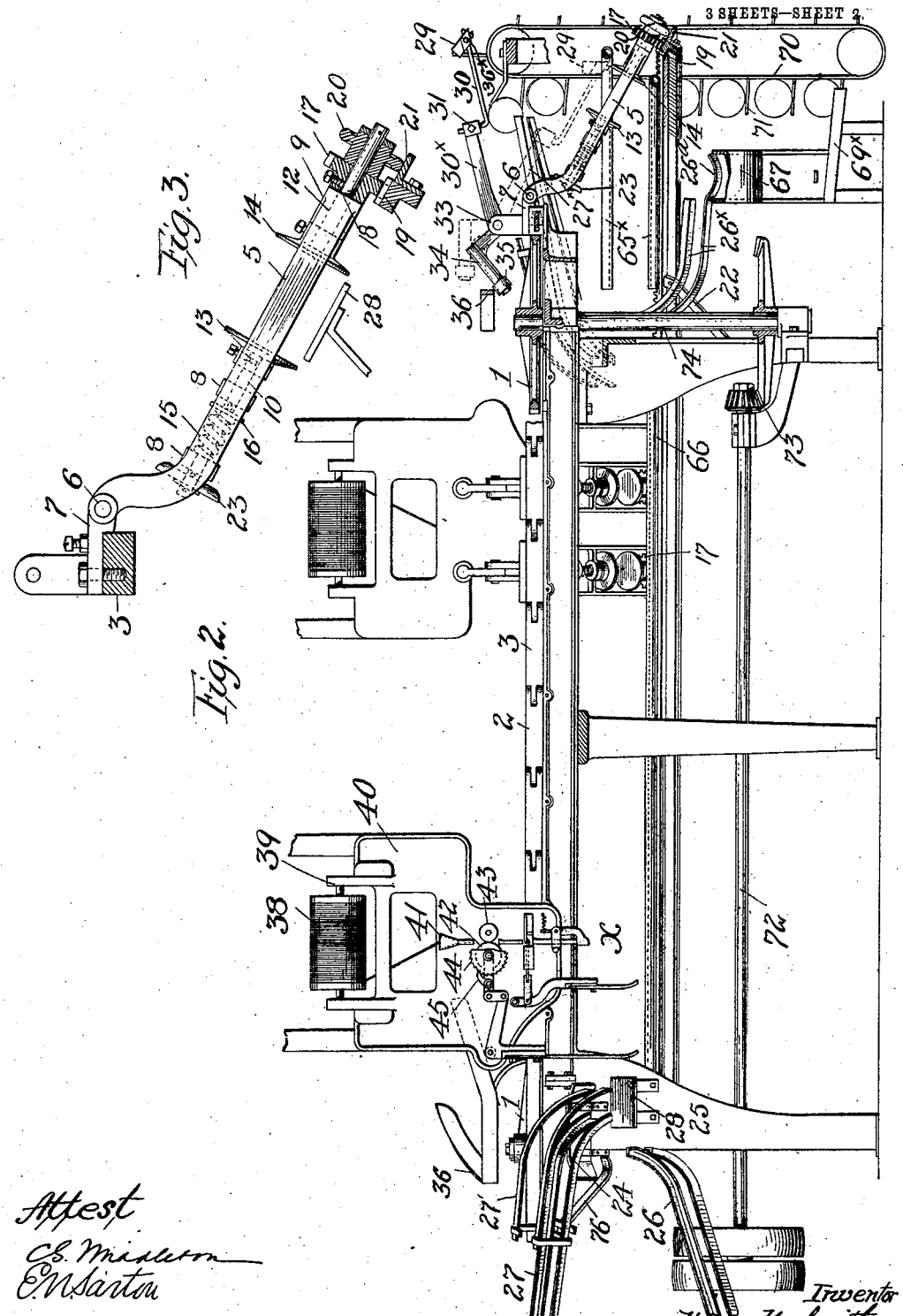

No. 859,851. PATENTED JULY 9, 1907.
H. K. SMITH.
CAN SOLDERING MACHINE.
APPLICATION FILED NOV. 10, 1906.

3 SHEETS—SHEET 3.

UNITED STATES PATENT OFFICE.

HARRY KING SMITH, OF FEDERALSBURG, MARYLAND, ASSIGNOR, BY MESNE ASSIGNMENTS, TO FEDERAL CAN COMPANY, OF FEDERALSBURG, MARYLAND, A CORPORATION OF MARYLAND.

CAN-SOLDERING MACHINE.

No. 859,851.  Specification of Letters Patent.  Patented July 9, 1907.

Application filed November 10, 1906. Serial No. 342,888.

*To all whom it may concern:*

Be it known that I, HARRY KING SMITH, a citizen of the United States, residing at Federalsburg, Maryland, have invented certain new and useful Improvements in Can-Soldering Machines, of which the following is a specification.

This invention belongs to can soldering machines of that general type in which the cans are carried past solder feeding devices and heating means to receive the solder and have the same sweated into the seam.

It is the object of the invention to provide a simple and effective construction and one with which the operation of soldering may be carried out without waste of the soldering material.

The invention consists in the features, combination and arrangement of parts hereinafter described and particularly pointed out in the claims.

Figure 4:
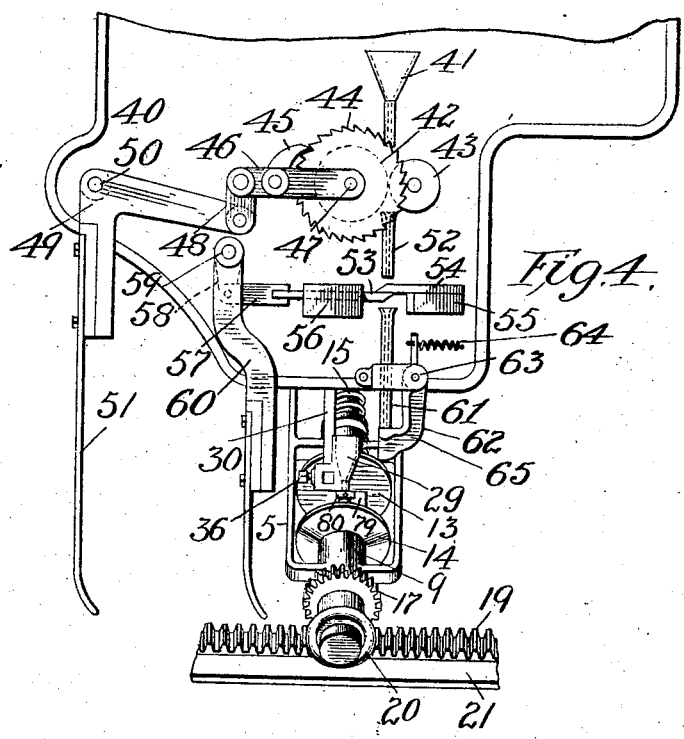
Figure 5:
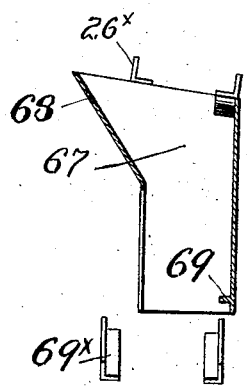

In the accompanying drawings,—Figure 1 is a plan view of a machine embodying the invention, parts being omitted for convenience of illustration. Fig. 2 is a side elevation of the machine with parts in section and parts omitted for convenience of illustration. Fig. 3 is a detail view of one of the can carrying arms with parts in section. Fig. 4 is a front view of the solder-wire feeding devices with one of the can holding means approaching the same to receive the solder therefrom. Fig. 5 is a detail view of can reversing means.

In these drawings, 1 indicates wheels about which pass an endless chain, 2, composed of links 3 pivoted together, one of the said wheels being provided with teeth 4 to engage the links and drive the chain. These links carry supports or clamping mechanism for the cans. This clamping mechanism comprises a frame 5 pivotally secured at 6 to a bracket 7 bolted to the link of the chain, the said frame having bearings 8 and 9, in the former of which the shaft 10 is journaled, and in the latter of which turns the shaft 12. These shafts carry respectively the clamping plates or disks 13, 14 arranged axially in line with each other. The shaft 10 is adapted to have longitudinal sliding movement in its bearings, being pressed towards the opposing disk 14 by a spring 15 surrounding the shaft 10, and pressing at one end against the bearing 8, and at the other end against the collar or flange 16 secured to the shaft. The other disk 14 is fixed to its shaft and this shaft is adapted to have rotary movement only in its bearings, each carrying for this purpose a gear wheel 17 fixed thereto by a set screw 18, the said gear meshing with a rack 19 extending for some distance along the machine and parallel with the endless chain.

The outer end of the shaft 12 carries a roller 20 adapted to roll on a plain track or flange 21, which extends alongside and parallel with the rack 19, and is supported by the same brace or bracket 22, which supports the rack, it being understood that any number of these brackets or braces may be employed. The clamp is opened by retracting the shaft 10 against the pressure of the spring 15, and for this purpose the said shaft carries a flange or roller 23 adapted to engage a cam track 24 which is supported from one of the standards 25 of the machine in proper position to be engaged by the said roll or flange 23 when the same is brought around thereto by the movement of the chain or endless carrier. By the action of this roll against the cam the clamping disk 13 is retracted and the can which has been carried between the clamping disks is allowed to drop into a discharge chute 26 and a fresh can with its heads applied thereto is permitted to enter between these clamping disks through a chute 27. The relation of these chutes is shown in Fig. 2, it being observed that the chute 26 is in advance of the chute 27 so as to receive the discharged can from the disks after which the said disks receive a fresh can from the chute 27. After the can leaves the chute 27 it is temporarily supported upon a rest or bracket 28 supported upon the standard 25. As soon as the can from the feed chute 27 is in place between the clamps 13—14, the clamp 13 will close thereupon by reason of the roller 23 riding on the low part of the cam 24 and upon leaving this cam track the can will be securely clamped in position between the disks 13—14 and will be in constant rotary motion owing to the gear 17 traveling upon the stationary rack.

It will be noticed from Fig. 2 that the clamping frames 5 incline downwardly and outwardly and the cans are thus held in inclined position so as to present the seam in proper relation to the solder applying and solder heating or melting devices, this inclined position being preferred to cause the molten solder to enter the seam. For the purpose of directing the solder to the seam each of the can carrying frames has associated therewith a solder directing tube or member 29 carried by an arm 30, which is adjustably held by a set screw 31 in an arm 30× pivoted to the upwardly extending ears 33 of the bracket 7 carried by the link of the chain, the said arm 30× having an extension 34 provided with a roll 35 adapted to engage the cam track 36, which is supported from the main frame work by the arms 37. The solder directing tube is secured to arm 30 by a set screw 36× by which the said tube may be accurately adjusted in relation to the can. The purpose of pivoting the lever or arm carrying the solder directing member 29 is to permit the said member or tube to be elevated sufficiently to clear the stations or points where the can is to be discharged from the can carrying frame and a fresh can is to be fed into place between the clamping heads or disks 13—14. These actions of discharging and feeding cans take place at opposite points of travel of the endless chain or carrier and upon opposite sides thereof in respect to the drums 1. The cam tracks 24 and 36 therefore, together with the feeding in and the discharge chutes are arranged adjacent to the directing wheels or drums at the ends of the machine. The cams 36 are arranged at a point over the directing drums and the rolls 35 engage the lower faces or edges of these cam tracks so that the solder feeding tube or member is elevated and then allowed to fall back into position when the end of the cam track is reached.

At an intermediate point along the endless chain and on opposite sides of the machine solder feeding devices are arranged, it being understood that the machine is double acting in the sense that both ends of the can are soldered in passing it once through the machine, cans being fed into the machine at one end being soldered while passing to the other end, being reversed in position at said other end of the machine, being soldered at their remaining ends while passing back to the end of the machine first mentioned and being there discharged. Therefore one of the solder feeding devices is arranged at each side of the machine so that in the passage of a can from the feeding in point adjacent to one drum to the final discharge point adjacent the same drum it will be carried past the solder feeding devices to receive the solder therefrom, and this solder feeding action takes place substantially simultaneously on two of the cans upon opposite sides of the machine. The solder is in the form of wire or ribbon held upon a reel 38 journaled in bearings 39 in a frame or bracket 40 suitably supported. This bracket carries thereon below the solder reel a funnel-shaped directing tube 41 and below this are journaled feed rolls 42, 43, the former roll having connected therewith a ratchet wheel 44, operated by a pawl 45, carried by an arm 46 pivoted on the shaft or pin 47 supporting the ratchet wheel, the said arm 46 being connected by a link 48 with a lever 49 pivoted to the bracket or frame 40 at 50 and having a depending arm 51 extending into the path of the rollers 20 of the can carrying frames or supports so that each time one of said frames passes the arm 51 the solder feed rolls will be operated through the described connections to feed downwardly a sufficient length of the solder wire to supply the can held in the frame or clamps to which the particular roller mentioned belongs.

From the solder feed rolls the wire passes through a tube 52 between knives or cutters 53—54, the latter of which is supported in stationary relation on a projection 55 and the other knife being movable and guided in a boss or bracket 56. This knife is connected by a link 57 with an arm 58 extending downwardly from a rock shaft 59 journaled on the main bracket of the solder feed mechanism, and which rock shaft has a dependent arm 60 extending into the path of the roller 20, above mentioned, so that after the proper length of solder wire has been fed downwardly by the action of this roller the cutting mechanism will be operated by the said roller as it moves onward and the solder wire will be cut and this will be held in a tube or guide 61 supported on the main bracket, it being retained in the said tube by a trip lever or holder 62 pivoted to the bracket at 63 and held in normal position by a spring 64 so that its lower end 65 will extend under the tube 61 and close the end thereof to hold the length of solder which has been cut from falling therethrough until the can has arrived in proper position to receive the said solder. When the can so arrives in proper position the solder directing tube or block 29, which moves with its clamping frame strikes the retaining or trip lever 62 and pushes it aside so that the length of solder cut off and lying in the tube 61 is now free to drop, and in doing so it enters the wide mouth of the directing tube 29 and is thus directed with its lower end upon the seam of the can. Any suitable form of heating or solder melting devices may be employed to direct a heating medium, such as a flame to the can and the end of the solder wire, and these heating tubes may be arranged at any desired points preceding and following the solder feeding mechanism and may be of any desired number or extent. Cooling tubes may also be employed for directing a cooling blast of air upon the cans after being soldered. Tubes of this character are shown at 65×, 66, Fig. 2, the former being cooling tubes and the latter heating tubes.

It will be seen from the above that the machine is provided with individual can holders and rotating means; that said rotating means positively operates being driven each by its pinion and by the rack, and that each can holder has associated therewith a solder holding and guiding device, the carrier means for which move the said device to keep pace with the can holding and rotating mechanism. It will be observed also that the lengths of solder wire or ribbon are cut off as a result of the approach of the can holder to the solder feeding point and that when cut off each length of solder, is retained in the holding tube until the can arrives in proper position below it to receive said solder.

It will be seen that the machine is continuously operating and that the solder is supplied in proper lengths to the directing and holding tubes as the said tubes are passing with continuous motion by the solder feeding and cutting mechanism.

The arms 5 for carrying the can clamping mechanism are pivoted at 6 so that these arms rest by gravity on the track 21 through the medium of the rollers 20, and by this means the pinions 17 are maintained in proper mesh with the rack 19. This pivoted arrangement of the clamp carrying arms 5 also permits the arms to have the necessary slight pivotal movement in passing around the ends of the machine and avoids the necessity of forming a rack and track of special construction.

It will be observed that the solder tubes rest by gravity upon the cans directly at the seam to be soldered and by reason of this these tubes act as distributing irons for the solder.

As above stated, each can is soldered at both ends thereof during one passage of the can through the machine. For this purpose, as above described, the cans are first fed into the machine by the chute 27, at the left of Figs. 1 and 2. They are soldered at one end in passing the solder feeding devices at the point X in Figs. 1 and 2, these devices being constructed and arranged as above described, and upon their arrival at the opposite end of the machine they are released from their carrying arms in order that they may be reversed and returned to the machine with their unsoldered ends in position. For this purpose the cans soldered at one end are released from their carrying arms into a chute 26×, similarly arranged to that above described at 26. This chute directs them to the reversing device. At this device one side of the chute or the side which is in the lower plane than the other side is extended as at 26ᵃ so that the end of the can which is soldered will be supported by this extension while the other end of the can will be free to fall downwardly which it does on reaching this point. This causes the can to turn over and fall with its soldered end uppermost into a reverser box or chute 67, having its upper end flared at 68 to receive the can as it turns over and falls into said chute. On one side of this chute a projection 69 is arranged against which the can strikes as it falls through the chute and as this contact of the can with the projection takes place at the extreme edge of the can, said can will make a quarter turn and fall into the supplemental chute 69×. The can will now be in a position substantially a half turn from the position it occupied in the discharge chute 26× and consequently in the can holder and by returning it to the machine in this position it will be, when gripped and carried by its carrying frame, in position to be soldered at the end opposite that previously soldered. This returning action may be effected in any suitable manner as for instance by an elevator 70 consisting of an endless belt having arms 71, or projections extending out therefrom to receive the cans thereon and elevate them so as to be delivered into the second feed chute 27× which returns them to the machine to be grasped by the clamps 13—14 in precisely the same manner as previously described. The second soldering action takes place at the station or point Y whereat a set of solder feed, cutting and controlling devices are arranged in a manner similar in all respects to that described in connection with the devices at the station x. After being completely soldered the cans are discharged at the left hand end of the machine through the chute 26.

The machine may be driven in any suitable manner as by the shaft 72, the gearing 73 and the vertical shaft 74 on which the wheel 1 is secured.

In order to insure the quick discharge of the cans from their clamping disks 13, 14 a leaf or pressure spring 76 is employed secured to a part of the feeding in chute and arranged to exert pressure on the can when it reaches the discharge chute so as to insure its discharge thereinto as soon as the clamps release it. A suitable form of rotary wiper may be employed in the path of the cans rotating in a direction across the seam and driven from the main shaft, this wiper being intended to wipe the joint after being soldered. This wiper is indicated in dotted lines at 77 in Fig. 1.

I do not wish to limit myself to a chain form of carrier, nor is it necessary to have one of the can carrying arms on each link. The spaces between the can carrying arms are closed by the guards or plates 78 carried by the said arms. The disk 13 is swiveled to its shaft so as to turn with the can. For convenience of illustration I have shown the feeding in chute slightly displaced in relation to the machine, it appearing at an angle to the plane of the chute 26. The feeding in chute has guard strips 27' near its end for insuring the proper direction of the can downwardly and its delivery into the can holding means. It will be readily understood that the solder feeding cutting and holding devices may be operated by any part of the can holding means coming in contact with the operating levers, and indeed the can itself may be used for this purpose.

From Figs. 2 and 3 it will be seen that the holding frame or arm 5 for the cans has a drop therein adjacent to the pivot. This brings the roller 23 below the said pivot so that the line of draft exerted by the cam 24 upon the shaft 10 will be in a direction extending, beneath the said pivot, and a leverage will be exerted by the action of the cam against the roller tending to seat the roller 20 on its track or in other words tending constantly to hold the can carrying frame or arm in its proper operative position. This is particularly desirable at the points where the cans are discharged from and fed into the machine for at these points the can holding or clamping means should register accurately with the feeding in and discharge means.

While I have shown and described the preferred position of the can holding means it will be understood that said means may be arranged to hold and carry the cans in positions other than inclining downwardly and outwardly without departing from the essential principle of my invention. Further, while I have shown and described a solder supply consisting of a reel of wire solder and means for cutting and feeding the same, I do not limit myself in this regard as the solder may be supplied in other forms than that disclosed herein.

As above stated the solder tubes or solder directing members are adapted to act as distributers for the solder. For this purpose they may rest upon the can or they may simply contact with the can in order to distribute the solder. In addition to spreading or distributing the solder in this way I may employ a soldering iron or block and this may be used in conjunction with the solder directing tube. Such a block is shown at 79 pivoted to a collar 80 or the solder directing tube as shown in Fig. 4.

I prefer to form the end of the chute which is extended at 26ᵃ on a curve so that the one end of the can will drop into this curved part and be retained therein momentarily while the other end of the can, free from support, is dropping down to begin the reversing action. Neither do I wish to limit myself to the end of the solder directing tube or member as the means for operating the trip lever 62 as this may be done by contact with some other moving part.

I claim as my invention:—

1. In combination, in a soldering machine, a carrier, a series of arms attached thereto, pairs of clamps for the cans carried by the said arms, means for rotating the said pairs of clamps on each arm, means for supplying solder, and means for moving the solder supplying means to and from the clamps, substantially as described.

2. The combination in a can soldering machine, carrier means, arms attached thereto, can clamping means carried by the said arms, pinions for rotating the said can clamping means, a rack for driving the pinions, a plain track and a roller supported on the can holding arm and running on the track to control the engagement of the pinion with the rack, substantially as described.

3. In combination in a can soldering machine, a carrier, a series of arms having pivotal connection therewith and clamping means for both ends of the cans all carried by the said arms, and means at the opposite ends of the arms from the pivots for rotating the can clamping means on the pivoted arms consisting of the pinions and the rack, said arms by their weight keeping the pinions in mesh with the rack, substantially as described.

4. In combination in a can soldering machine, a carrier, can clamping means carried thereby and arranged to permit the discharge of the cans by gravity therefrom, a feeding in chute to direct the cans to the can clamping means by gravity, means for opening the can clamping means before arriving at the said chute to discharge the soldered can and for closing the clamping means on receiving the unsoldered can from the said chute, substantially as described.

5. In combination in a can soldering machine, a carrier, can clamping means carried thereby, means for opening the can clamping means to discharge the soldered can and receive the unsoldered can, and a rest upon which the can is supported on its side at the point where the clamping means are opened, said rest supporting the freshly fed can while the can clamping means are open, substantially as described.

6. In combination in a can soldering machine, a carrier, can clamping means carried thereby, a feed in chute, a discharge chute, means for opening the can clamping means at the discharge chute and prior to the arrival at the feeding in chute and for closing the can clamping means at the feeding in chute, the ends of said chutes being in different horizontal planes and the can clamping means moving between them, substantially as described.

7. The combination, of a carrier, can clamping means thereon, feeding in chute and discharge chute, the former arranged above and the latter below the path of the can clamps, means for opening the can clamping means, and a device arranged over the discharge chute to contact with the side of the can and press the same downwardly away from the can clamping means, substantially as described.

8. In combination in a can soldering machine, a carrier, can clamping and rotating means thereon, a solder directing member for each can, and a movable carrier for each solder directing member, with means for operating the said carrier, in relation to the can clamping means, substantially as described.

9. In combination in a can soldering machine, a carrier a series of arms attached thereto, can clamping and rotating means on the said arms, solder directing members and carrier arms for the solder directing members pivotally mounted, and a cam whereby said carrying arms are raised and lowered, substantially as described.

10. In combination in a can soldering machine, a carrier, can clamping and rotating means attached thereto, means for opening and closing the clamping means, solder directing members and means for automatically moving the said solder directing members to and from operative position in order to allow the cans to be fed in, substantially as described.

11. In combination in a can soldering machine, a main carrier, arms attached thereto, clamping and rotating means carried by the arms, solder directing members, carrier means therefor, moving in unison with the cans, said carrier means being attached to the main carrier, and means for moving the carrier means upon the main carrier, substantially as described.

12. In combination in a can soldering machine, a carrier, a series of clamping means for holding and rotating the cans, soldering means, means whereby the cans are released from the holding and rotating means, means for reversing the cans and returning them to the same series of clamping means in reversed position so that in one passage of a can through the machine both ends thereof will be soldered, substantially as described.

13. In combination in a can soldering machine, carrier means, a series of can holding and rotating means attached thereto, means for releasing the cans therefrom, a chute to receive the cans when so released, a reversing means, a return chute to feed the cans back to the same series of can holding means, and a conveyer for moving the cans from the reverser to the return chute, substantially as described.

14. In combination in a can soldering machine, the carrier, means for holding and rotating the cans, soldering devices, reversing mechanism consisting of a chute having one portion cut away to allow the can at that end to drop, an abutment or stop against which the can strikes in falling to thereby complete its reversing movement, and means for returning the can in reversed position to the can holding means, substantially as described.

15. In combination in a can soldering machine, the carrier, can holding means, solder directing members moving in unison with the can holding means, means for supplying suitable lengths of solder comprising a holding device, and a member retaining the solder in said holder and to be operated during the passage of the solder directing member whereby the length of solder in the holder falls therefrom into the said solder directing member, substantially as described.

16. In combination in a can soldering machine, a carrier, can holding means, a member for directing the solder to the seam moving in unison with the can holding means, a solder holding member, and a device for closing the lower portion of the said member, said device being adapted to be operated during the passage of the solder directing member for the discharge of the solder from the holding member into the directing member, substantially as described.

17. In combination in a can soldering machine, a carrier, can holding means carried thereby, solder feeding and cutting mechanism a device moving in unison with the can holding means, for operating the solder feeding and cutting mechanism and means relatively fixed in respect to the carrier for holding the cut lengths of solder until the can is brought by the carrier in position to receive it substantially as described.

18. In combination in can soldering machinery, a carrier holding means for the cans carried thereby, solder feeding and cutting means, a holding device for the cut solder, including a trip or movable closure, and means whereby the solder feeding and cutting devices are operated before the can holding means arrives at the soldering station, and means whereby the trip is operated when the can holding means arrives at the solder station, substantially as described.

19. In combination in can soldering machinery, a carrier can holding means carried thereby, solder feeding means, cutting means, means relatively fixed in respect to the carrier for holding the cut solder, and means for delivering it to the can, said feeding, cutting and delivery means being operated during the passage of the can holding means past the feeding, cutting and delivery means, substantially as described.

20. In combination, a carrier, the can holders attached thereto comprising a series of arms and clamps thereon and the guards arranged between and carried by the said arms, substantially as described.

21. In combination in a can soldering machine, a carrier, a plurality of clamping means carried thereby, arms or frames carrying the said clamping means, pivotally connected at their upper ends to the carrier a rack at the lower ends of the arms and, pinions for rotating the clamping means, said pinions maintaining their engagement with the rack by the gravity of the parts, substantially as described.

22. In combination in can soldering machines, can holding means, solder directing means, a solder distributing device, feeding in and discharging chutes and means for raising and lowering the solder directing and solder distributing means, substantially as described.

23. In combination in can soldering machines, can carrying means, a member for directing the solder thereto, and solder holding means including a trip, said trip being operated by contact of the directing member when the latter passes the holding member, substantially as described.

24. In combination in a can soldering machine, a carrier, carrier arms or frames for the cans pivotally supported and having a drop therein at one point, clamps carried by the arms, a rack and pinions for rotating the said clamps, means for opening the clamps, said means exerting its pressure in a line passing below the pivots to hold the carrier frames in proper position, substantially as described.

25. In combination in a can soldering machine, a carrier, can holding devices thereon, a feeding-in chute, a discharge chute, said chutes being arranged with their ends adjacent, a cam located near the said adjacent ends for opening the holding means when the cans arrive at the discharge chute, maintaining them open and allowing them to close after the can is received from the feeding in chute.

26. In combination in a can soldering machine, a series of holding means for the cans, a solder directing member for each holding means, a main carrier, arms pivoted to the main carrier and carrying the solder directing member, and means for moving the said arms, substantially as described.

27. In combination in a can soldering machine, a main carrier, a plurality of solder feeding members, carriers for the solder feeding members supported on the main carrier, can supporting means, and means for moving the carriers to separate the solder feeding members from the cans, substantially as described.

In testimony whereof, I affix my signature in presence of two witnesses.

HARRY KING SMITH.

Witnesses:
   HENRY B. MESSENGER,
   HENRY E. COOPER.